US008613206B2

(12) United States Patent
Iwata

(10) Patent No.: US 8,613,206 B2
(45) Date of Patent: Dec. 24, 2013

(54) METHOD FOR MANUFACTURING GLASS SUBSTRATE FOR MAGNETIC DISK AND METHOD FOR MANUFACTURING MAGNETIC DISK

(75) Inventor: Katsuyuki Iwata, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 791 days.

(21) Appl. No.: 12/088,844

(22) PCT Filed: Mar. 15, 2007

(86) PCT No.: PCT/JP2007/055246
§ 371 (c)(1),
(2), (4) Date: Mar. 31, 2008

(87) PCT Pub. No.: WO2007/111149
PCT Pub. Date: Oct. 4, 2007

(65) Prior Publication Data
US 2009/0280241 A1 Nov. 12, 2009

(30) Foreign Application Priority Data

Mar. 24, 2006 (JP) .................................. 2006-83018
Mar. 24, 2006 (JP) .................................. 2006-83019

(51) Int. Cl.
*C03C 21/00* (2006.01)
(52) U.S. Cl.
USPC ........................... 65/30.14; 65/30.1; 65/30.13
(58) Field of Classification Search
USPC ..................... 65/30.1, 30.13, 30.14
See application file for complete search history.

(56) References Cited

U.S. PATENT DOCUMENTS 3,751,238 A * 8/1973 Grego et al. .................. 65/30.14
5,865,867 A * 2/1999 Kinoshita ...................... 65/17.3
5,916,656 A * 6/1999 Kitayama et al. ............. 428/64.1
2003/0110803 A1* 6/2003 Saito et al. .................... 65/30.14
2003/0220183 A1* 11/2003 Kurachi et al. ................. 501/70
2005/0284179 A1* 12/2005 Isono et al. .................. 65/30.14

FOREIGN PATENT DOCUMENTS

| JP | 07223844 A | * | 8/1995 |
| JP | 09124345 A | * | 5/1997 |
| JP | 10-194789 A | | 7/1998 |
| JP | 10194789 A | * | 7/1998 |

(Continued)

OTHER PUBLICATIONS

Machine Translation of JP07-223844, performed on Sep. 1, 2011.*
Singapore Office Action (and Written Opinion by the Australian Patent Office, dated Oct. 2, 2009 (corresponding to Singapore Patent Application No. 200802426-7).
Japanese Office Action corresponding to Japanese Patent Application No. 2007-071677 (claiming priority from Japanese Patent Application No. 2006-83019), dated May 18, 2010.
Japanese Office Action corresponding to JP Patent Application No. 2007-071676 mailed May 17, 2011.

*Primary Examiner* — Matthew Daniels
*Assistant Examiner* — Lisa Herring
(74) *Attorney, Agent, or Firm* — Sughrue Mion, PLLC

(57) ABSTRACT

This invention provides a method for manufacturing a glass substrate for a magnetic disk comprising a chemical strengthening step. The method provides a glass substrate for a magnetic disk that can suppress the occurrence of very small waves in cooling a glass substrate after the chemical strengthening step, and, while preventing troubles such as head crush and thermal asperity, can realize lowered flying height of a magnetic head and high-density information recording, and is particularly suitable for application to small-size magnetic disks for portable information equipment. In the step of cooling after the chemical strengthening step, cooling treatment is carried out in which the glass substrate is brought into contact with a treatment liquid containing a melt of a material having a solidification temperature below that of a chemical strengthening salt. The temperature of the treatment liquid is regulated to be below the temperature of the chemical strengthening salt melted liquid in the chemical strengthening step.

23 Claims, 2 Drawing Sheets

(56) References Cited

FOREIGN PATENT DOCUMENTS

| | | | |
|---|---|---|---|
| JP | 10226539 A | 8/1998 | |
| JP | 2000-293844 A | 10/2000 | |
| JP | 2000293844 A | * 10/2000 | |
| JP | 2001-192239 A | 7/2001 | |
| JP | 2001192239 A | * 7/2001 | |
| JP | 2002-121051 A | 4/2002 | |

* cited by examiner

METHOD FOR MANUFACTURING GLASS SUBSTRATE FOR MAGNETIC DISK AND METHOD FOR MANUFACTURING MAGNETIC DISK

TECHNICAL FIELD

The present invention relates to a method for manufacturing a glass substrate for a magnetic disk by which a magnetic disk to be used in a hard disk drive (HDD) serving as a magnetic disk apparatus is manufactured, and a method for manufacturing a magnetic disk by use of the glass substrate for a magnetic disk.

BACKGROUND ART

Today, information recording technology, particularly, magnetic recording technology is needing a drastic technical innovation, attendant on the progress of the so-called IT industry. In magnetic disks loaded in hard disk drives (HDD) functioning as magnetic disk apparatuses, rapid increases in information recording density are being made, unlike the cases of other magnetic recording media such as magnetic tapes and flexible disks.

Such a magnetic disk has a magnetic layer or the like formed on a substrate such as an aluminum alloy substrate and a glass substrate. In a hard disk drive, while a magnetic head is kept flying over a magnetic disk being rotated at a high speed, an information signal is recorded into the recording layer as a magnetization pattern or is reproduced from the recording layer by this magnetic head.

In recent years, in such magnetic disks, the information recording density has come to exceed 40 Gbits per square inch, and, further, a superhigh recording density of more than 100 Gbits per square inch is about to be realized. The recent magnetic disks with which a high information recording density can be realized as above have a feature such that a practically sufficient amount of information can be stored therein notwithstanding the much smaller disk areas, as compared with the flexible disks and the like magnetic disks according to the related art.

In addition, the magnetic disks under consideration have also a feature such that the information recording speed and reproduction speed (response speed) are extremely high, as compared with those of other information recording media, and that information can be written and read at any time desired.

As a result of the attention paid to the various features of the magnetic disks, in recent years, there has been a demand for a small-size hard disk drive capable of being mounted in portable apparatuses which are much smaller in housing size than personal computers and in which a high response speed is demanded, such as cellular phones, digital cameras, portable information equipment (e.g., PDA (personal digital assistant)) and car navigation systems.

Along with the increased demand for mounting of a hard disk drive into a portable apparatus (i.e., for the so-called "mobile use"), a glass substrate composed of a glass, which is a hard material, has been adopted as a substrate for the magnetic disk. This is because glass substrates are higher in strength and rigidity than substrates composed of a metal, which is a soft material.

Besides, in the glass substrates, a smooth surface can be obtained. By use of a glass substrate, therefore, it is possible to obtain a magnetic disk with which a decrease in the flying height of the magnetic disk operative to perform recording and reproduction while flying over the magnetic disk (a lowered flying height) can be realized together with a high information recording density, while preventing such troubles as head crash and thermal asperity.

The glass substrates, however, also have an aspect that the glass is a brittle material. In view of this, there have been proposed various methods for strengthening glass substrates. For example, Patent Document 1 describes a chemical strengthening treatment in which a glass substrate is immersed in a melted liquid of a nitrate, such as sodium nitrate (NaNO3) and potassium nitrate (KNO3), heated at about 300° C. in a chemical strengthening tank for a predetermined time, whereby lithium ions (Li+) in surface layer parts of the glass substrate are replaced by sodium ions (Na+) or potassium ions (K+), or sodium ions (Na+) in surface layer parts of the glass substrate are replaced by potassium ions (K+), and compressive stress layers are formed at the surface layer parts on both sides, with a tensile stress layer being formed between the compressive stress layers.

In addition, Patent Document 2 describes a method for performing a chemical strengthening treatment while suppressing warping of a glass substrate, in which a tiny amount of a cationic impurity is mixed into a nitrate melted liquid used in the chemical strengthening treatment so as to regulate the complete solidification point of the nitrate to 130° C. or below, thereby ensuring that the nitrate shows fluidity when cooled after the chemical strengthening treatment.

Patent Document 1: JP-A-2002-121051
Patent Document 2: JP-A-2001-192239

DISCLOSURE OF INVENTION

Problems to be Solved by the Invention

Meanwhile, it has been found that, in the chemical strengthening step as above-mentioned, the occurrence of very small waves on the glass substrate after the chemical strengthening step cannot be suppressed satisfactorily. It has also been found that the very small waves are generated in cooling the glass substrate after the chemical strengthening step.

Besides, in recent years, attendant on the increase in the information recording density on magnetic disks, lowering the flying height of magnetic heads has been advanced. Therefore, a glass substrate having a smoother surface than those in the related art has been demanded, and the above-mentioned very small waves have come to be a problem.

The present invention has been made in consideration of the above-mentioned circumstances. Accordingly, it is an object of the present invention to provide a method for manufacturing a glass substrate for a magnetic disk including a chemical strengthening step for chemically strengthening a surface layer of a glass substrate by bringing the glass substrate into contact with a heated chemical strengthening salt melted liquid, whereby it is possible to manufacture a glass substrate for a magnetic disk that can suppress the occurrence of very small waves in cooling a glass substrate after the chemical strengthening step, and, while preventing troubles such as head crash and thermal asperity, can realize a lowered flying height of a magnetic head and high-density information recording and is particularly capable of configuring magnetic disks suitable for application to small-size hard disk drives for portable information equipment.

In addition, the present invention aims at providing a method for manufacturing a magnetic disk by which it is possible to manufacture a magnetic disk that can realize a lowered flying height of a magnetic head and high-density information recording while preventing troubles such as head crash and thermal asperity and is particularly suitable for use in small-size hard disk drives for portable information equipment, by use of the above-mentioned glass substrate for a magnetic disk.

Means for Solving the Problems

The present inventor has found out that the very small waves generated on the glass substrate as above-mentioned are generated due to volume variation and heat of solidification of a salt generated when a strengthening salt left on the glass substrate is crystallized by cooling after the chemical strengthening step.

In view of this, the method for manufacturing a glass substrate for a magnetic disk according to the present invention has one of the following structures.

[Structure 1]

A method for manufacturing a glass substrate for a magnetic disk, including: a chemical strengthening step of bringing a glass substrate into contact with a heated chemical strengthening salt melted liquid and chemically strengthening a surface layer of the glass substrate at a desired temperature, and a cooling step of cooling the glass substrate having undergone the chemical strengthening step, wherein in the cooling step, the temperature of the glass substrate is lowered to a predetermined temperature, without solidifying the chemical strengthening salt in the chemical strengthening salt melted liquid adhered to a surface of the glass substrate.

[Structure 2]

A method for manufacturing a glass substrate for a magnetic disk, including: a chemical strengthening step of brining a glass substrate into contact with a heated chemical strengthening salt melted liquid and chemically strengthening a surface layer of the glass substrate at a desired temperature, and a cooling step of cooling the glass substrate having undergone the chemical strengthening step, wherein in the cooling step, a cooling treatment is carried out in which the glass substrate is brought into contact with a treatment liquid containing a melt of a material having a solidification temperature below that of the chemical strengthening salt, and the temperature of the treatment liquid is regulated to be below the temperature of the chemical strengthening salt melted liquid in the chemical strengthening step.

[Structure 3]

The method for manufacturing a glass substrate for a magnetic disk having Structure 2, wherein the cooling treatment includes a first cooling treatment in which the glass substrate is brought into contact with a first treatment liquid, and a second cooling treatment or second and latter cooling treatments in which the glass substrate is brought into contact (sequentially) with at least one treatment liquid including a second treatment liquid or of second and latter treatment liquids after the first cooling treatment;

the first treatment liquid used in the first cooling treatment is regulated to a temperature which is below the temperature of the chemical strengthening salt melted liquid in the chemical strengthening step and which is above the solidification temperature of the chemical strengthening salt; and the second or latter treatment liquid used in the second or latter cooling treatment is regulated to a temperature which is below the temperature of the precedent-stage treatment liquid used in the cooling treatment carried out precedent to the cooling treatment in consideration and which is above the solidification temperature of the precedent-stage treatment liquid.

[Structure 4]

A method for manufacturing a glass substrate for a magnetic disk, including: a chemical strengthening step of immersing a glass substrate in a heated chemical strengthening salt melted liquid contained in a chemical strengthening treatment tank and chemically strengthening a surface layer of the glass substrate at a desired temperature, and a glass substrate holding step of immersing the glass substrate, having undergone the chemical strengthening step, in a treatment liquid contained in a glass substrate holding tank and holding the glass substrate in the immersed state, wherein the treatment liquid contained in the glass substrate holding tank contains a melt of a material having a solidification temperature below that of the chemical strengthening salt and is regulated to a temperature which is below the temperature of the chemical strengthening salt melted liquid in the chemical strengthening step.

[Structure 5]

The method for manufacturing a glass substrate for a magnetic disk having Structure 4, wherein the glass substrate holding step includes a first holding treatment in which the glass substrate is immersed in a first treatment liquid contained in a first glass substrate holding tank, and a second holding treatment or second and latter holding treatments in which the glass substrate is brought into contact (sequentially) with a second treatment liquid or with second and latter treatment liquids contained in at least one glass substrate holding tank including a second glass substrate holding tank or of second and latter glass substrate holding tanks after the first holding treatment; the first treatment liquid used in the first holding treatment is regulated to a temperature which is below the temperature of the chemical strengthening salt melted liquid in the chemical strengthening step and which is above the solidification temperature of the chemical strengthening salt; and the second or latter treatment liquid used in the second or latter holding treatment is regulated to a temperature which is below the temperature of a precedent-stage treatment liquid used in the holding treatment precedent to the holding treatment in consideration and which is above the solidification temperature of the precedent-stage treatment liquid.

According to the present invention, in the cooling step of cooling the glass substrate after the chemical strengthening step, or in the glass substrate holding step, the glass substrate is brought into contact with or immersed in a treatment liquid containing a melt of a material having a solidification temperature lower than that of the chemical strengthening salt before crystallization of the chemical strengthening salt melted liquid remaining on the glass substrate begins. Therefore, the glass substrate can be cooled, while preventing the occurrence of very small waves in the surface of the glass substrate. The treatment liquid, desirably, is preliminarily regulated to a temperature higher than the solidification temperature of the chemical strengthening salt. Incidentally, in the present invention, the details of the chemical strengthening treatment are not particularly limited.

[Structure 6]

The method for manufacturing a glass substrate for a magnetic disk having any one of Structures 2 to 5, wherein the treatment liquid is a melted liquid containing a nitrate as a main material.

[Structure 7]

The method for manufacturing a glass substrate for a magnetic disk having Structure 6, wherein the treatment liquid contains a plurality of nitrates selected from among alkali metal nitrates and alkaline earth metal nitrates in a predetermined ratio, whereby the treatment liquid is regulated to have a desired solidification temperature.

[Structure 8]

The method for manufacturing a glass substrate for a magnetic disk having any one of Structures 1 to 7, wherein the temperature of the glass substrate having undergone the chemical strengthening step is lowered stepwise.

In addition, the method for manufacturing a magnetic disk according to the present invention has the following Structures.

[Structure 9]

A method for manufacturing a glass substrate for a magnetic disk, including: a chemical strengthening step of bringing a glass substrate into contact with a heated chemical strengthening salt melted liquid and chemically strengthening a surface layer of the glass substrate at a desired temperature, and a cooling step of cooling the glass substrate having undergone the chemical strengthening step, wherein in the cooling step, a surface of the glass substrate is coated with a melted liquid containing a melt of a material capable of being solidified into a vitreous form, before the temperature of the glass substrate is lowered.

[Structure 10]

The method for manufacturing a glass substrate for a magnetic disk having Structure 9, wherein in the cooling step, the temperature of the glass substrate is lowered to a predetermined temperature while preventing crystallization of the chemical strengthening salt on a surface of the glass substrate.

[Structure 11]

The method for manufacturing a glass substrate for a magnetic disk having Structure 9 or 10, wherein the temperature of the melted liquid with which the surface of the glass substrate is coated in the cooling step is regulated to be above the solidification temperature of the chemical strengthening salt.

[Structure 12]

The method for manufacturing a glass substrate for a magnetic disk having any one of Structures 9 to 11, wherein the melted liquid with which the surface of the glass substrate is coated in the cooling step is a nitrate melted liquid obtained by thermally melting a nitrate regulated to be capable of being solidified into a vitreous form.

[Structure 13]

The method for manufacturing a glass substrate for a magnetic disk having Structure 12, wherein the nitrate contains a plurality of nitrates selected from among alkali metal nitrates and alkaline earth metal nitrate in a predetermined ratio.

[Structure 14]

A method for manufacturing a magnetic disk, wherein at least a magnetic layer is formed on a glass substrate for a magnetic disk which is manufactured by the method for manufacturing a glass substrate for a magnetic disk having any one of Structures 1 to 13.

Effects of the Invention

In the method for manufacturing a glass substrate for a magnetic disk according to the present invention, in the cooling step of cooling the glass substrate after the chemical strengthening step, or in the glass substrate holding step, the glass substrate is brought into contact with or immersed in a treatment liquid containing a melt of a material having a solidification temperature lower than that of the chemical strengthening salt, or is coated with a melted liquid containing a melt of a material capable of solidification into a vitreous form (amorphous form), before crystallization of the chemical strengthening salt melted liquid remaining on the glass substrate begins. Therefore, the glass substrate can be cooled, while preventing the occurrence of very small waves in the surface of the glass substrate.

Accordingly, the present invention can provide a method for manufacturing a glass substrate for a magnetic disk including a chemical strengthening step for chemically strengthening a surface layer of a glass substrate by bringing the glass substrate into contact with a heated chemical strengthening salt melted liquid, whereby it is possible to manufacture a glass substrate for a magnetic disk that can suppress the occurrence of very small waves in cooling a glass substrate after the chemical strengthening step, and, while preventing troubles such as head crash and thermal asperity, can realize a lowered flying height of a magnetic head and high-density information recording and is particularly capable of configuring magnetic disks suitable for application to small-size hard disk drives for portable information equipment.

In addition, the present invention can provide a method for manufacturing a magnetic disk by which it is possible to manufacture a magnetic disk that can realize a lowered flying height of a magnetic head and high-density information recording while preventing troubles such as head crash and thermal asperity and is particularly suitable for use in small-size hard disk drives for portable information equipment, by use of the above-mentioned glass substrate for a magnetic disk.

BEST MODE FOR CARRYING OUT THE INVENTION

Figure 1:
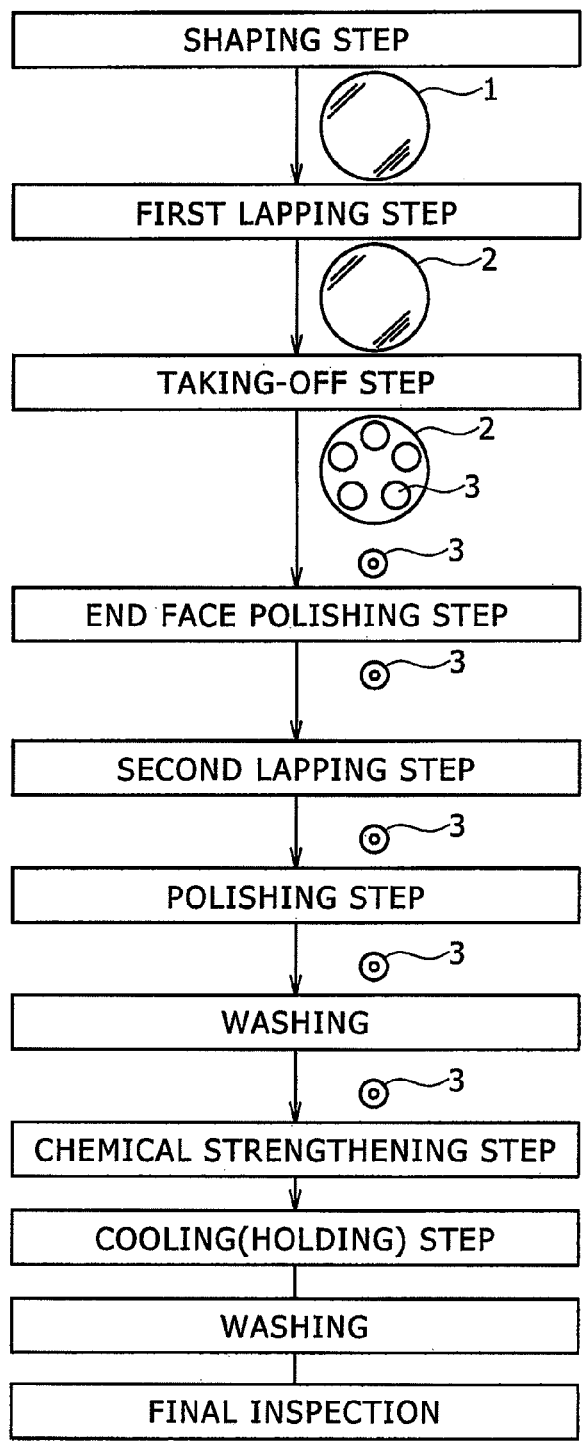
FIG. 1 is a flow chart showing steps in a method for manufacturing a glass substrate for a magnetic disk according to the present invention.

Now, a best mode for carrying out the present invention will be described in detail below referring to the drawings.

FIG. 1 is a flow chart showing the steps of a method for manufacturing a glass substrate for a magnetic disk according to the present invention.

[Lapping Step]

In the method for manufacturing a glass substrate for a magnetic disk according to the present invention, first, as shown in FIG. 1, a principal surface of a plate-shaped glass 1 is subjected to a lapping (grinding) treatment to obtain a glass base material 2, then the glass base material 2 is cut to obtain a glass substrate 3, and a principal surface of the glass substrate 3 is subjected to at least a polishing treatment.

As the plate-shaped glass 1 subjected to the lapping treatment, various-shaped plate-shaped glasses 1 can be used. The shape of the plate-shaped glass 1 may be a rectangular shape or a disk (circular disk) shape. A disk-like plate-shaped glass 1 can be lapped by use of a lapping apparatus used in manufacturing a glass substrate for a magnetic disk according to the related art, whereby machining with high reliability can be carried out inexpensively.

The size of the plate-shaped glass 1 has to be larger than the size of the glass substrate for a magnetic disk to be manufactured. For example, in the case of manufacturing a glass substrate for a magnetic disk to be mounted in a "1-inch type hard disk drive" or smaller-sized type hard disk drive, the diameter of the glass substrate for a magnetic disk is about 20 to 30 mm, so that the diameter of the disk-like plate-shaped glass 1 is preferably not less than 30 mm, more preferably not less than 48 mm. When a disk-like plate-shaped glass 1 having a diameter of not less than 65 mm is used, a plurality of glass substrates for magnetic disks to be mounted in the "1-inch type hard disk drive" can be taken off from a single plate-shaped glass 1, which is suitable for mass production.

The plate-shaped glass 1 can be manufactured, for example, from a molten glass material by a known method such as a press method, a floating method and a fusion method. Among these methods, the press method makes it possible to manufacture the plate-shaped glass 1 at low cost.

In addition, the material for the plate-shaped glass 1 is not particularly limited insofar as it is a glass which can be chemically strengthened, and examples of the preferable material include aluminosilicate glass. Particularly preferred is lithium-containing aluminosilicate glass. With such an aluminosilicate glass used, a compressive stress layer having a preferable compressive stress and a tensile stress layer having a preferable tensile stress can be precisely obtained through an ion exchange type chemical strengthening treatment, particularly, a low-temperature ion exchange type chemical strengthening treatment; therefore, such an aluminosilicate glass is preferable as the material for a chemically strengthened glass substrate 3 for a magnetic disk.

As for the composition of such an aluminosilicate glass, the glass preferably contains 58 to 75 wt. % of $SiO_2$, 5 to 23 wt. % of $Al_2O_3$, to 10 wt. % of $Li_2O$, and 4 to 13 wt. % of $Na_2O$ as main constituents.

Further preferably, the aluminosilicate glass contains 62 to 75 wt. % of $SiO_2$, 5 to 15 wt. % of $Al_2O_3$, 4 to 10 wt. % of $Li_2O$, 4 to 12 wt. % of $Na_2O$, and 5.5 to 15 wt. % of $ZrO_2$ as main constituents, with a $Na_2O$ to $ZrO_2$ weight ratio ($Na_2O/ZrO_2$) being from 0.5 to 2.0 and an $Al_2O_3$ to $ZrO_2$ weight ratio ($Al_2O_3/ZrO_2$) being from 0.4 to 2.5.

The lapping treatment (first lapping step) is a machining for the purpose of enhancing the shape accuracy (e.g., flatness) and/or dimensional accuracy (e.g., accuracy of plate thickness) of the principal surface(s) of the plate-shaped glass 1. The lapping treatment is conducted by pressing a grindstone or a surface plate against the principal surface of the plate-shaped glass 1 and relatively moving the plate-shaped glass 1 and the grindstone or surface plate so as to grind the principal surface of the plate-shaped glass 1. Such a lapping treatment can be carried out by use of a both side lapping apparatus utilizing a planetary gear mechanism.

As the grindstone for use in the lapping treatment, a diamond grindstone can be used. Besides, as free abrasive grains, there may be preferably used hard abrasive grains such as alumina abrasive grains, zirconia abrasive grains, and silicon carbide abrasive grains.

By the lapping treatment, the shape accuracy of the plate-shaped glass 1 is enhanced, and, as a result, a glass base material 2 the principal surface(s) of which is flattened in shape and the plate thickness of which is reduced to a predetermined value is formed. Since the principal surface(s) of the glass base material 2 has been flattened by the lapping treatment and the plate thickness has been reduced, the glass base material 2 can be cut to take off a glass substrate 3 from the glass base material 2. Specifically, the glass substrate 3 can be taken off from the glass base material 2 while preventing the occurrence of defects such as chipping, crazing and cracking.

[End Face Polishing Step]

It is preferable to preliminarily subjecting an end face of the glass substrate 3 to mirror finish polishing (end face polishing step). Since the end face of the glass substrate 3 has a cut shape, preliminary mirror-finish polishing of the end face can suppress the generation of particles from the end face, so that it is possible to favorably prevent the so-called thermal asperity trouble in a magnetic disk manufactured by use of the glass substrate for a magnetic disk. In addition, with the end face mirror finished, it is possible to prevent delayed fracture from occurring due to microcracks. The mirror-finished state of the end face is preferably a mirror finish with an arithmetical mean roughness (Ra) of 100 mm or below.

[Second Lapping Step]

A lapping treatment (second lapping step) is preferably conducted before a polishing step for the glass substrate 3 which will be described later. The lapping treatment in this instance can be carried out by the same means as in the above-mentioned lapping treatment of the plate-shaped glass 1. With the glass substrate 3 subjected to the lapping treatment before the polishing treatment, a mirror-finished principal surface can be obtained in a shorter time.

[Polishing Step]

The glass substrate 3 taken off from the glass base material 2 is subjected to a polishing treatment so as to mirror finish the principal surface(s) of the glass substrate 3.

By the polishing treatment, cracks present in the principal surface(s) of the glass substrate 3 are removed, and the very small waves in the principal surface(s) are reduced, for example, to a maximum value of 5 nm or below. The maximum value of the very small waves in this case is a maximum value of measurements of waves having a frequency corresponding to a wavelength of 4 μm to 1 mm obtained by a non-contact laser interference method using "MicroXAM", a product by PHASE SHIFT TECHNOLOGY. The region of measurement is the inside of a rectangle (800 μm×980 μm) having side lengths of 800 μm and 980 μm.

With the principal surface(s) of the glass substrate 3 mirror finished in this manner, occurrence of the so-called crash trouble and thermal asperity trouble can be prevented in the magnetic disk manufactured by use of the glass substrate 3, even where the flying height of a magnetic head is 10 nm, for example. In addition, with the principal surface(s) of the glass substrate 3 mirror finished in this manner, it is possible, in a chemical strengthening step described later, to perform a uniform chemical strengthening treatment in fine regions of the glass substrate 3 and to prevent delay fracture from occurring due to microcracks.

The polishing treatment is conducted, for example, by a method in which a surface plate with a polishing fabric (e.g., polishing pad) adhered thereto is pressed against a principal surface of the glass substrate 3, and, while supplying a polishing medium to the principal surface of the glass substrate 3, the glass substrate 3 and the surface plate are brought into a relative movement, thereby polishing the principal surface of the glass substrate 3. In this case, the polishing medium preferably contains abrasive grains for polishing. As the abrasive grains for polishing, colloidal silica abrasive grains can be used. It is recommendable to use abrasive grains having a mean grain diameter of 10 to 200 nm as the abrasive grains for polishing.

Besides, another polishing treatment may be used, for example, a tape polishing method in which a tape-shaped polishing fabric (e.g., a polishing tape) is pressed against a principal surface of the glass substrate 3, and, while supplying a polishing medium to the principal surface of the glass substrate 3, the glass substrate 3 and the polishing fabric are brought into a relative movement, thereby polishing the principal surface of the glass substrate 3. In this case, the polishing medium preferably contains abrasive grains for polishing.

As the abrasive grains for polishing, diamond abrasive grains can be used. It is recommendable to use abrasive grains having a mean grain diameter of 10 to 200 nm as the abrasive grains for polishing.

The polishing surface of the polishing pad or polishing tape is preferably formed of a resin material such as polyurethane and polyester. The polishing pad preferably has a polishing surface formed of a foamed resin (e.g., foamed polyurethane), while the polishing tape preferably has a polishing surface formed of resin fibers (e.g., polyester resin fibers).

[Chemical Strengthening Step]

Figure 2:
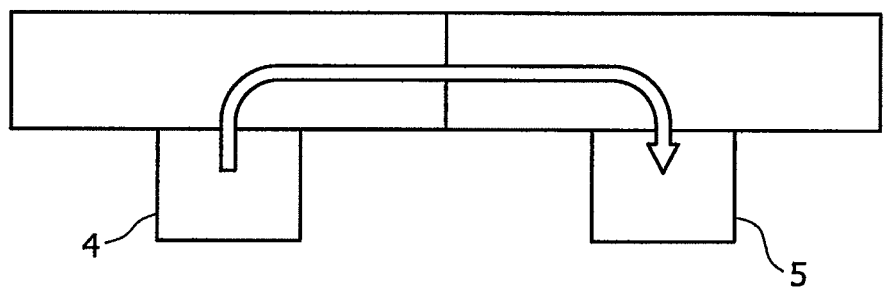
FIG. 2 is a side view showing a chemical strengthening step and a cooling step, or a glass substrate holding step, in the method for manufacturing a glass substrate for a magnetic disk according to the present invention.

FIG. 2 is a side view showing a chemical strengthening step and a cooling step or a glass substrate holding step in the method for manufacturing a glass substrate for a magnetic disk according to the present invention.

The glass substrate 3 is subjected to a chemical strengthening treatment in a chemical strengthening step or steps before and/or after the polishing step. By the chemical strengthening step, a high compressive stress can be generated in a surface layer of the glass substrate for a magnetic disk, whereby impact resistance of the glass substrate can be enhanced. Particularly, where an aluminosilicate glass is used as the material for the glass substrate 3, the chemical strengthening treatment can be performed suitably.

In the chemical strengthening step, ion exchange is effected by bringing the glass substrate 3 into contact with a chemical strengthening salt melted liquid containing ions having an ionic radius greater than that of the ions contained in the glass substrate 3. The chemical strengthening step is carried out by use of a chemical strengthening treatment tank 4 as shown in FIG. 2, wherein the glass substrate is immersed in the chemical strengthening salt melted liquid containing ions having an ionic radius larger than that of the ions contained in the glass substrate.

The chemical strengthening step is equivalent to a step known as a chemical strengthening treatment method, in which a heated chemical strengthening salt melted liquid can be used as the chemical strengthening salt melted liquid. Examples of the ion exchange method which are known include a low temperature type ion exchange method, a high temperature type ion exchange method, a surface crystallization method, and a glass surface dealkalization method; among these methods, preferred is the low temperature type ion exchange method in which ion exchange is carried out in a temperature region not exceeding a slow cooling point for the glass.

Incidentally, the low temperature type ion exchange method here means a method in which, in a temperature region of not higher than the slow cooling point for a glass, alkali metal ions contained originally in the glass are replaced by alkali metal ions having an ionic radius larger than that of the original alkali metal ions, resulting in that a compressive stress is generated in a glass surface layer due to the increase in volume at ion-exchanged portions, whereby the glass surface layer is strengthened.

Incidentally, the heating temperature for the chemical strengthening salt melted liquid in performing the chemical strengthening treatment is preferably 280 to 660° C., particularly, 300 to 400° C., from the viewpoint of favorable proceeding of ion exchange, etc. The period of time for which the glass substrate 3 is kept in contact with the chemical strengthening salt melted liquid is preferably in the range of from several hours to several tens of hours. Incidentally, it is preferable to heat the glass substrate 3 to a temperature of 100 to 300° C. as a preheating, before bringing the glass substrate 3 into contact with the chemical strengthening salt melted liquid.

The material of the chemical strengthening treatment tank 4 in which to perform the chemical strengthening step is not particularly limited insofar as the material has excellent corrosion resistance and a low-dusting property. Since the chemical strengthening salt and the chemical strengthening salt melted liquid are oxidizing and the treating temperature is high, it is necessary here to select a highly corrosion-resistant material, thereby suppressing the tank from being damaged or dusting, and thereby restraining thermal asperity trouble and head crash. From this point of view, quartz materials are particularly preferable as the material for the chemical strengthening treatment tank 4; however, stainless steel materials, particularly, highly corrosion-resistant martensitic or austenitic stainless steel materials can also be used. Incidentally, since the quartz materials are expensive though they are excellent in corrosion resistance, the material for the tank may be adequately selected, taking payability into account.

The chemical strengthening salt melted liquid is preferably a melted liquid of a nitrate containing an alkali metal element, for example, a nitrate containing potassium nitrate, sodium nitrate, lithium nitrate or the like. Incidentally, the amount of lithium element contained in the nitrate is preferably 0 to 2000 ppm. When such a chemical strengthening salt is used in the chemical strengthening treatment of a glass, particularly, an aluminosilicate glass that contains lithium element, it is possible to realize a glass substrate for a magnetic disk with predetermined rigidity and impact resistance. When the amount of the lithium ions contained in the chemical strengthening salt melted liquid is too large, the ion exchange may be hampered, making it difficult to obtain the tensile strength or compressive strength intended in the present invention.

[Cooling Step, or Glass Substrate Holding Step]

In the present invention, the glass substrate having undergone the chemical strengthening step is subjected to a glass substrate holding step in which, as shown in FIG. 2, the glass substrate 3 is immersed in a treatment liquid contained in a glass substrate holding tank 5, and the glass substrate 3 is held in this condition. The glass substrate holding step is also a cooling step in which the glass substrate 3 is cooled after the surface of the glass substrate 3 is coated with a melted liquid by immersing the glass substrate 3 in the melted liquid contained in the glass substrate holding tank 5.

In the cooling step (or the glass substrate holding step), the temperature of the glass substrate is lowered to a predetermined temperature (e.g., room temperature), while preventing solidification of the chemical strengthening salt in the chemical strengthening melted liquid adhered to the surface of the glass substrate 3.

Incidentally, the chemical strengthening salt melted liquid is changed in state in the order of liquid state, sherbet-like state and solid state as its temperature is lowered. In view of this, the cooling step (or the glass substrate holding step) is made to be a step in which the temperature of the glass substrate 3 is lowered to a predetermined temperature (e.g., room temperature), while preventing the chemical strengthening salt in the chemical strengthening salt melted liquid adhered to the surface of the glass substrate 3 from being deposited (from becoming sherbet-like).

In the cooling step (or the glass substrate holding step), a cooling treatment (or a holding treatment) is conducted in which the glass substrate is brought into contact with a treatment liquid containing a melt of a material having a solidification temperature lower than that of the chemical strengthening salt. The temperature of the treatment liquid is regulated to be below the temperature of the chemical strengthening salt melted liquid in the chemical strengthening step. More specifically, a treatment liquid which contains a melt of a material having a solidification temperature below that of the chemical strengthening salt and which is regulated to a temperature below the temperature of the chemical strengthening salt melted liquid in the chemical strengthening step is contained in the glass substrate holding tank 5, and the glass substrate is immersed in the treatment liquid.

The treatment liquid can be a melted liquid containing a nitrate as a main material. The treatment liquid may contain a plurality of nitrates selected from among alkali metal nitrates and alkaline earth metal nitrates, in predetermined proportions, whereby the treatment liquid can be regulated to have a desired solidification temperature.

Or, alternatively, in the cooling step, the surface of the glass substrate is preliminarily coated with a melted liquid containing a melt of a material capable of being solidified into a vitreous form (amorphous form), before the temperature of the glass substrate is lowered. The temperature of the melted liquid with which to coat the surface of the glass substrate is preliminarily regulated to be above the solidification temperature of the chemical strengthening salt. To be more specific, a melted liquid which contains a melt of a material to be solidified into a vitreous form and which is regulated to a temperature lower than the temperature of the chemical strengthening salt melted liquid in the chemical strengthening step and higher than the solidification temperature of the chemical strengthening salt is contained in the glass substrate holding tank 5, and the glass substrate is immersed in this treatment liquid.

The melted liquid with which to coat the surface of the glass substrate in the cooling step may be a melted liquid obtained by melting a nitrate by heating. Specifically, the melted liquid may be a nitrate melted liquid obtained by thermally melting a nitrate which has been so regulated as to be solidified into a vitreous form. Examples of such a nitrate include materials which each contain a plurality of nitrates selected from among alkali metal nitrates and alkaline earth metal nitrates, in predetermined proportions.

The duration of immersion in the treatment liquid or melted liquid, may be any period of time which is sufficient for the chemical strengthening salt remaining on the glass substrate to diffuse into the treatment liquid or melted liquid; for example, the immersion time is preferably in the range from several minutes to several tens of minutes.

The glass substrate thus immersed in the treatment liquid or melted liquid is subsequently immersed in hot water and then in cold water to be cooled to room temperature, and the materials of the treatment liquid or melted liquid on the disk substrate are dissolved away.

When the surface of the glass substrate is thus preliminarily coated with the melted liquid containing a melt of a material to be solidified into a vitreous form (amorphous form) before crystallization of the chemical strengthening salt remaining on the glass substrate begins, the glass substrate can be cooled while preventing the generation of very small waves in the surface of the glass substrate.

[Description of Melted Liquid]

The melted liquid used in the cooling step described above is liquid at temperatures above the solidification temperature of the chemical strengthening salt used in the chemical strengthening step.

The melted liquid for use in the cooling step is preferably a liquid which contains the same metal salt as the chemical strengthening salt used in the chemical strengthening step. Incidentally, in the case where the chemical strengthening salt used in the chemical strengthening step is composed of a plurality of metal salts, it is preferable that the melted liquid contains at least a part of the metal salts constituting the chemical strengthening salt, more preferably all of the metal salts.

In addition, the melted liquid for use in the cooling step is preferably one that mixes with the chemical strengthening salt melted liquid used in the chemical strengthening step so as to lower the crystallization temperature of the chemical strengthening salt melted liquid. This makes it possible to lower the crystallization temperature of the chemical strengthening salt melted liquid adhered to the surface of the glass substrate upon the chemical strengthening step.

Meanwhile, where the temperature at which the treatment liquid solidifies and starts crystallizing is above the temperature of hot water used for dissolving away the materials of the treatment liquid, there is a possibility that the treatment liquid may be crystallized on the glass substrate upon immersion of the glass substrate in the hot water. In order to avoid such a situation, it is preferable that, by use of second and latter treatment liquids, the glass substrate is immersed sequentially into the treatment liquids containing respective materials which begin to solidify and crystallize at progressively lowered temperatures and that the treatment liquid for immersion just precedent to the immersion into the hot water starts solidifying and crystallizing at a temperature below the temperature of the hot water.

In other words, the cooling treatment (or the holding treatment) in the cooling step (or the glass substrate holding step) may include a first cooling treatment in which the glass substrate is brought into contact with a first treatment liquid, and a second cooling treatment or second and latter cooling treatments in which, after the first cooling treatment, the glass substrate is (sequentially) brought into contact with at least one treatment liquid, i.e., either with a second treatment liquid or with second and latter treatment liquids. In this case, the first cooling treatment (or holding treatment) of immersing the glass substrate in the first treatment liquid contained in a first glass substrate holding tank and the second (and latter) cooling treatment(s) (or holding treatment(s)) of immersing the glass substrate (sequentially) in the second treatment liquid or in the second and latter treatment liquids contained in at least one glass substrate holding tank, i.e., in a second glass substrate holding tank or in second and latter glass substrate holding tanks are carried out.

The first treatment liquid for use in the first cooling treatment (or holding treatment) is preliminarily regulated to a temperature which is below the temperature of the chemical strengthening salt melted liquid in the chemical strengthening step and is above the solidification temperature of the chemical strengthening salt. In addition, each of the second and latter treatment liquids for use in the second and latter cooling treatments (or holding treatments) is regulated to a temperature which is below the temperature of the precedent-stage treatment liquid used in the cooling treatment precedent to the cooling treatment in consideration and is above the solidification temperature of the precedent-stage treatment liquid.

In this case, in the cooling step (or glass substrate holding step), the temperature of the glass substrate having undergone the chemical strengthening step can be lowered stepwise.

When the glass substrate is thus brought into contact with or immersed in the treatment liquids containing the melts of the materials having solidification temperatures below that of the chemical strengthening salt before the start of crystallization of the chemical strengthening salt remaining on the glass substrate, the glass substrate can be cooled while preventing generation of very small waves in the surface of the glass substrate.

Incidentally, the cooling step (or glass substrate holding step) can also be considered to be a contact step in which the chemical strengthening melted liquid adhered to the surface of the glass substrate subjected to the chemical strengthening treatment is diffused from the surface of the glass substrate without solidifying and in which the glass substrate having undergone the chemical strengthening treatment is brought into contact with the treatment liquids containing the melts of the materials having solidification temperatures below the solidification temperature of the chemical strengthening melted liquid.

[Description of Treatment Liquid]

The treatment liquids used in the cooling step described above are liquid at temperatures above the solidification temperatures of the chemical strengthening salt used in the chemical strengthening step.

Each of the treatment liquids for use in the cooling step is preferably a liquid containing the same metal salt as the chemical strengthening salt used in the chemical strengthening step. Incidentally, where the chemical strengthening salt used in the chemical strengthening step is composed of a plurality of metal salts, it is preferable that each of the treatment liquids contains at least a part of the metal salts constituting the chemical strengthening salt, more preferably all of the metal salts.

In addition, it is preferable that each of the treatment liquids for use in the cooling step is one that mixes with the chemical strengthening salt melted liquid used in the chemical strengthening step, thereby lowering the crystallization temperature of the chemical strengthening salt melted liquid. This makes it possible to lower the crystallization temperature of the chemical strengthening salt melted liquid adhered to the surface of the glass substrate upon the chemical strengthening step.

[Washing Step, Etc.]

The glass substrate 3, after completion of the above-mentioned chemical strengthening step and the cooling step (or glass substrate holding step), is subjected to a washing step, etc., as shown in FIG. 1, to be a product (a glass substrate for a magnetic disk).

The glass substrate for a magnetic disk according to the present invention which is manufactured in the above-described manner is particularly suitable for use as a glass substrate for thin magnetic disks having a disk thickness of less than 0.5 mm, particularly, a disk thickness of 0.1 to 0.4 mm. In addition, the glass substrate for a magnetic disk is particularly suitable for use as a glass substrate for small-size magnetic disks having a disk diameter (outer diameter) of 30 mm or below. This is because such a thin small-size magnetic disk is mounted in "1-inch type hard disk drives" or in hard disk drives smaller in size than the "1-inch type hard disk drives". Namely, the glass substrate for a magnetic disk is suitable for use as a glass substrate for a magnetic disk mounted in "1-inch type hard disk drives" or in hard disk drives smaller in size than the "1-inch type hard disk drives".

Incidentally, the glass substrate for a magnetic disk which is to be used for manufacture of a magnetic disk mounted in the "1-inch type hard disk drive" has a diameter of about 27.4 mm and a disk thickness of 0.381 mm. On the other hand, the glass substrate for a magnetic disk which is to be used for manufacture of a magnetic disk mounted in a "0.85-inch type hard disk drive" has a diameter of about 21.6 mm.

With the Structure according to the present invention, it is possible to provide a method of manufacturing a glass substrate for a magnetic recording medium adapted to a magnetic head having a flying height of not more than 6 nm, for example.

[Forming of Magnetic Layer]

In the method for manufacturing a magnetic disk according to the present invention, as a magnetic layer formed on the glass substrate for a magnetic disk which has been manufactured as above-described, a magnetic layer including a cobalt (Co) ferromagnetic material can be used, for example. Particularly, the magnetic layer is formed as a magnetic layer including a cobalt-platinum (Co—Pt) ferromagnetic material or cobalt-chromium (Co—Cr) ferromagnetic material with which a high coercive force can be obtained. Incidentally, as a method for forming the magnetic layer, a DC magnetron sputtering method can be used.

In addition, it is preferable that an under layer or the like is intermediately formed, if necessary, between the glass substrate and the magnetic layer. Examples of the material which can be used for forming such an under layer or the like include Al—Ru alloys and Cr alloys.

Besides, on the magnetic layer, a protective layer may be provided for protecting the magnetic disk from the impact of a magnetic head. As the protective layer, a hard hydrocarbon protective layer can be preferably used.

Furthermore, a lubricating layer composed of PFPE (perfluoropolyether) may be formed on the protective layer, whereby interference between the magnetic head and the magnetic disk can be moderated. The lubricating layer can be formed, for example, by forming a coating film by a dipping method.

EXAMPLES

Now, the present invention will be described specifically by showing examples and comparative examples. Incidentally, the present invention is not limited to the Structures of these examples.

[Examples of Method for Manufacturing Glass Substrate for Magnetic Disk]

The method for manufacturing a glass substrate for a magnetic disk in the following examples is composed of the following steps (1) to (9).

(1) Rough lapping step (rough grinding step)
(2) Shaping step
(3) Fine lapping step (fine grinding step)
(4) End face mirror finishing (polishing) step
(5) First polishing step
(6) Second polishing step
(7) Chemical strengthening step
(8) Cooling step
(9) Washing step First, a disk-like glass base material formed of an amorphous aluminosilicate glass was prepared. The aluminosilicate glass contains lithium. On a composition basis, the aluminosilicate glass contains 63.6 wt. % of $SiO_2$, 14.2 wt. % of $Al_2O_3$, 10.4 wt. % of $Na_2O$, 5.4 wt. % of $Li_2O$, 6.0 wt. % of $ZrO_2$, and 0.4 wt. % of $Sb_2O_3$.

(1) Rough Lapping Step

A 0.6 mm thick sheet glass formed from the molten aluminosilicate glass was used as a glass base material, and a disk-like glass substrate having a diameter of 28.7 mm and a thickness of 0.6 mm was obtained from the sheet glass by use of a grinding stone.

It suffices for the aluminosilicate glass as the material of the sheet glass to contain 58 to 75 wt. % of $SiO_2$, 5 to 23 wt. % of $Al_2O_3$, 4 to 13 wt. % of $Na_2O$, and 3 to 10 wt. % of $Li_2O$.

Next, the glass substrate is subjected to a lapping step for enhancing dimensional accuracy and shape accuracy. The lapping step was carried out on a both side lapping apparatus using abrasive grains of grain size #400.

More specifically, alumina abrasive grains of grain size #400 were first used, the charge was set to about 100 kg, and a sun gear and an internal gear were rotated, whereby both sides of the glass substrate contained in a carrier were lapped to a surface precision (profile irregularity) of 0 to 1 µm and a surface roughness (Rmax) of about 6 µm.

(2) Shaping Step

Subsequently, by use of a cylindrical grindstone, a hole with a diameter of 6.1 mm was formed in a central part of the glass substrate. In addition, the outer peripheral end face was ground to obtain a diameter of 27.43 mm, and a predetermined chamfering was applied to the outer peripheral end face and the inner peripheral end face. In this case, the end faces of the glass substrate were made to have a surface roughness in terms of Rmax of about 4 µm.

(3) Fine Lapping Step

Next, the grain size of the abrasive grains was changed to #1000, and the principal surface of the glass substrate was lapped so that the principal surface had a surface roughness in terms of R max of about 2 µm and an arithmetical mean roughness (Ra) of about 0.2 µm.

By the fine lapping step, very small roughness formed in the principal surface of the glass substrate by the rough lapping step and the shaping step conducted as preceding steps was reduced.

Upon completion of the fine lapping step, the glass substrate was subjected to ultrasonic washing by immersing it sequentially in a neutral detergent and water which were contained in respective washing tanks and to which ultrasonic waves were applied.

(4) End Face Mirror Finishing (Polishing) Step

Subsequently, the end faces of the glass substrate were subjected to brush polishing by rotating the glass substrate so that the end faces (the inner peripheral end face and the outer peripheral end faces) of the glass substrate had a surface roughness in terms of arithmetical mean roughness (Ra) of about 40 nm.

Then, the principal surfaces of the glass substrate upon the end face mirror finishing were washed with water.

Incidentally, in the end face mirror finishing (polishing) step, the end faces of the glass substrates in the state of being stacked on each other are polished. In this case, in order to avoid scratching of the principal surfaces of the glass substrates, the end face mirror finishing (polishing) step is preferably conducted before the first polishing step described later, or before and/or after the second polishing step described later.

By the end face mirror finishing (polishing) step, the end faces of the glass substrate were polished to a mirror-finished state such that dusting of particles or the like could be prevented.

(5) First Polishing Step

Next, in order to remove flaws and/or strains left upon the above-mentioned fine lapping step, the first polishing step was conducted by use of a both side polishing apparatus.

The first polishing step was carried out by use of foamed polyurethane as a polishing pad. The polishing was conducted by use of a polishing liquid composed of cerium oxide and RO water. The glass substrate upon completion of the first polishing step was immersed sequentially in a neutral detergent, pure water (1), pure water (2), IPA (isopropyl alcohol), and IPA (vapor drying) contained in respective washing tanks, whereby the glass substrate was ultrasonic-washed and then dried.

(6) Second Polishing Step

Subsequently, the second polishing step as a mirror finishing step for the principal surfaces of the glass substrate was carried out by use of the same both side polishing apparatus as that used in the first polishing step, with the polisher replaced by a soft polishing pad (foamed polyurethane).

The second polishing step is conducted in order to securely remove cracks while maintaining the flat principal surfaces obtained by the above-mentioned first polishing step and to mirror finish the principal surfaces to obtain a surface roughness in terms of arithmetical mean roughness (Ra) of about 0.4 to 0.1 nm, for example.

As the polishing medium, a polishing liquid composed of colloidal silica abrasive grains (mean grain diameter: 80 nm) and RO water was used, under the conditions of a load of 100 g/cm2 and a polishing time of 5 min.

The glass substrate upon completion of the second polishing step was immersed sequentially in a neutral detergent, pure water (1), pure water (2), IPA (isopropyl alcohol), and IPA (vapor drying) contained in respective washing tanks, whereby the glass substrate was ultrasonic-washed and then dried.

(7) Chemical Strengthening Step

Next, the glass substrate upon completion of the washing was subjected to a chemical strengthening treatment. The chemical strengthening treatment was carried out by use of a chemical strengthening salt melted liquid obtained by melting a chemical strengthening salt prepared by mixing potassium nitrate, sodium nitrate and lithium nitrate.

In this example, a melt of KNO3:NaNO3=6:4 was used as the chemical strengthening salt melted liquid. The crystallization start temperature of the chemical strengthening salt melted liquid is about 230° C.

The chemical strengthening salt melted liquid was heated to 380° C., and the glass substrate upon completion of the washing and drying was immersed in the melted liquid contained in a chemical strengthening treatment tank for about 2 to 4 hours, whereby the chemical strengthening treatment was conducted. The immersion was carried out in the condition where a plurality of glass substrates for magnetic disks were contained in a holder so as to be held at their end faces, in order to ensure that the whole surface of each of the glass substrates for magnetic disks is chemically strengthened.

(8-1) Cooling Step (First Example)

The crystallization start temperature of the chemical strengthening salt melted liquid used in the chemical strengthening step is about 230° C. Taking this into consideration, the glass substrate drawn out of the chemical strengthening treatment tank was immersed in a first treatment liquid regulated to a temperature of 240 to 330° C., in the condition where the temperature of the glass substrate was maintained at or above 230° C. and crystallization of the chemical strengthening salt remaining on the surface of the glass substrate would not begin. The first treatment liquid had a composition of KNO3:NaNO3:CaNO3.4H2O=9:6:5. The crystallization start temperature of the first treatment liquid is about 190° C.

Or, alternatively, in consideration of the fact that the crystallization start temperature of the chemical strengthening salt melted liquid used in the chemical strengthening step is about 230° C., the surface of the glass substrate drawn out of the chemical strengthening treatment tank was coated by immersing the glass substrate in a treatment liquid regulated to a temperature of 240 to 330° C., in the condition where the temperature of the glass substrate was maintained at or above 230° C. and crystallization of the chemical strengthening salt remaining on the surface of the glass substrate would not begin. The treatment liquid had a composition of KNO3:CaNO3.4H2O=4:6. This treatment liquid is a liquid which is not crystallized even when cooled but is solidified into a vitreous form (amorphous form).

Next, the glass substrate drawn out of the first treatment liquid was immersed in a second treatment liquid regulated to a temperature of 200 to 230° C., in the condition where the temperature of the glass substrate was maintained at or above 190° C. and crystallization of the first treatment liquid remaining on the surface of the glass substrate would not begin. The second treatment liquid had a composition of KNO3:NaNO3:CaNO3.4H2O:LiNO3=3:2:3:2.

Then, the glass substrate drawn out of the second treatment liquid or treatment liquid was immersed in hot water regulated to a temperature of 50 to 80° C., and was kept immersed for about 10 min. Further, the glass substrate drawn out of the hot water was immersed in cold water at about 20° C., and was kept immersed for about 10 min.

In this manner, the temperature of the glass substrate was lowered to room temperature.

(8-2) Cooling Step (Second Example)

The glass substrate drawn out of the chemical strengthening treatment tank was immersed in a first treatment liquid regulated to about 270° C., in the condition where the temperature of the glass substrate was maintained at or above 230° C. and crystallization of the chemical strengthening salt remaining on the surface of the glass substrate would not begin. The first treatment liquid had a composition of KNO3:N.aNO3:CaNO3.4H2O=3:1:6. The crystallization start temperature of the first treatment liquid is about 150° C.

Next, the glass substrate drawn out of the first treatment liquid was immersed in a second treatment liquid regulated to about 170° C., in the condition where the temperature of the glass substrate was maintained at or above 150° C. and crystallization of the first treatment liquid remaining on the surface of the glass substrate would not begin. The second treatment liquid had a composition of KNO3:NaNO3:CaNO3.4H2O:LiNO3=5:3:8:4.

Then, the glass substrate drawn out of the second treatment liquid was immersed in hot water regulated to about 80° C., and was kept immersed for about 10 min. Further, the glass substrate drawn out of the hot water was immersed in cold water at about 20° C., and was kept immersed for about 10 min.

Or, alternatively, the surface of the glass substrate drawn out of the chemical strengthening treatment tank was coated by immersing the glass substrate in a treatment liquid regulated to a temperature of 240 to 330° C., in the condition where the temperature of the glass substrate was maintained at or above 230° C. and crystallization of the chemical strengthening salt remaining on the surface of the glass substrate would not begin. The treatment liquid had a composition of KNO3:NaNO3:CaNO3.4H2O=3:1:6. This treatment liquid is a liquid which is not crystallized even when cooled but is solidified into a vitreous form (amorphous form).

Next, the glass substrate drawn out of the treatment liquid was immersed in hot water regulated to a temperature of 50 to 80° C., and was kept immersed for about 10 min. Further, the glass substrate drawn out of the hot water was immersed in cold water at about 20° C., and was kept immersed for about 10 min.

In this manner, the temperature of the glass substrate was lowered to room temperature.

(9) Washing

The glass substrate for a magnetic disk upon completion of the cooling was washed by immersing it in concentrated sulfuric acid heated to about 40° C. Further, the glass substrate for a magnetic disk upon completion of the sulfuric acid washing was immersed sequentially in pure water (1), pure water (2), IPA (isopropyl alcohol), and IPA (vapor drying) contained in respective washing tanks, whereby the glass substrate was ultrasonic-washed and then dried.

Next, the principal surface of the glass substrate for a magnetic disk upon completion of the washing was visually inspected, and, further, was subjected to a precise inspection utilizing light reflection, scattering and transmission.

It was confirmed by use of an apparatus "OSA6100, a product by Candela", that the principal surface of the glass substrate for a magnetic disk which had been obtained by the above-mentioned steps was free of specific very small waves.

[Example of Method for Manufacturing Magnetic Disk]

In the next place, a magnetic disk was manufactured through the following steps.

An Al—Ru alloy seed layer, a Cr—W alloy under layer, a Co—Cr—Pt—Ta alloy magnetic layer, and a hydrocarbon protective layer are sequentially formed over both principal surfaces of the glass substrate for a magnetic disk obtained by the above-described steps, by use of a static facing type DC magnetron sputtering system. The seed layer has a function of refining the magnetic grains in the magnetic layer, and the under layer has a function of orienting the easy axis of magnetization of the magnetic layer into an in-plane direction.

The magnetic disk includes at least a glass substrate for a magnetic disk serving as a non-magnetic substrate, a magnetic layer formed over the glass substrate, a protective layer formed over the magnetic layer, and a lubricating layer formed over the protective layer.

A non-magnetic metallic layer (non-magnetic under layer) composed of a seed layer and an under layer is formed between the glass substrate for magnetic disk and the magnetic layer. In this magnetic disk, all the layers other than the magnetic layer are layers of non-magnetic materials. In this example, the magnetic layer and the protective layer are formed in contact with each other, and the protective layer and the lubricating layer are formed in contact with each other.

To be more specific, first, the Al—Ru (aluminum-ruthenium) alloy seed layer having a thickness of 30 nm is formed on the glass substrate for magnetic disk by sputtering conducted using an Al—Ru alloy (Al: 50 at %, Ru: 50 at %) as a sputtering target. Next, the Cr—W (chromium-tungsten) alloy under layer having a thickness of 20 nm was formed on the seed layer 5 by sputtering conducted using a Cr—W alloy (Cr: 80 at %, W: 20 at %) as a sputtering target. Subsequently, the Co—Cr—Pt—Ta (cobalt-chromium-platinum-tantalum) alloy magnetic layer having a thickness of 15 nm is formed on the under layer by sputtering conducted using a Co—Cr—Pt—Ta alloy (Cr: 20 at %, Pt: 12 at %, Ta: 5 at %, the remainder being Co) as a sputtering target.

Next, the hydrocarbon protective layer is formed on the magnetic layer, and, further, a PFPE (perfluoropolyether) lubricating layer is formed by a dipping method. The protective layer has a function of protecting the magnetic layer from an impact of a magnetic head.

The magnetic disk obtained as above was served to a gliding test by use of a glide head with a flying height of 10 nm, upon which no colliding foreign matter or the like was detected and a stable flying condition could be maintained. In addition, when the magnetic disk was served to a recording/reproduction test at 700 kFCl, a sufficient signal strength ratio (S/N ratio) could obtained. Besides, errors in the signal were not detected.

In addition, when the glass substrate obtained in the example above was served to a loading/unloading test, with the magnetic head flying height set to 6 nm, head crash did not occur during one million runs of the test.

Furthermore, when the magnetic disk was mounted in a "1-inch type hard disk drive" requiring an information recording density of not less than 60 Gbits per square inch and was driven, recording and reproduction could be performed without any problem. Specifically, no crash trouble or thermal asperity trouble was brought about.

Incidentally, in the present invention, the diameter (size) of the glass substrate for magnetic disk is not particularly limited. It is to be noted, however, that the present invention exhibits its excellent usability especially in the case of manufacturing a small-diameter glass substrate for a magnetic disk. The "small-diameter" here refers to, for example, glass substrates for magnetic disks which have a diameter of 30 mm or below.

To be more specific, the magnetic disks with a small diameter of not more than 30 mm, for example, are used in storage devices in in-vehicle equipment such as so-called car navigation systems or in portable equipment such as so-called PDA; and cellular phones, and are therefore required to have higher durability and impact resistance, as compared with ordinary magnetic disks used in equipment used in a stationary state.

In addition, by using the magnetic disk glass substrates manufactured in Example 1 and Example 2, magnetic disks for the perpendicular magnetic recording system were manufactured and were served to a loading/unloading test and a gliding test, to yield good results.

Comparative Example

As a comparative example, a glass substrate having been subjected to the chemical strengthening treatment in the same manner as the magnetic disk glass substrate in the above-described examples was drawn out of the chemical strengthening treatment liquid, and was cooled to room temperature in the state of being left to stand, whereby a magnetic disk glass substrate was obtained. When the principal surface of the magnetic disk glass substrate in this comparative example was inspected by an apparatus "OSA6100, a product by Candela", very small waves were observed in the principal surface.

Then, a magnetic disk was manufactured using this glass substrate, and was served to the same gliding test as in the examples, upon which head crash occurred.

Incidentally, the present invention can also be grasped as the following Structures of invention.

[Structure 15]
A method for manufacturing a glass substrate for a magnetic disk, including a chemical strengthening step of bringing a glass substrate into contact with a heated chemical strengthening salt melted liquid and chemically strengthening a surface layer of the glass substrate at a desired temperature,
wherein the method further includes a treatment in which the glass substrate having undergone the chemical strengthening treatment is brought into contact with a treatment liquid containing a melt of a material having a solidification temperature below that of the chemical strengthening salt.

[Structure 16]
The method for manufacturing a glass substrate for a magnetic disk having Structure 15,
wherein the temperature of the treatment liquid is set to be above the solidification temperature of the chemical strengthening salt.

[Structure 17]
A method for manufacturing a glass substrate for a magnetic disk, including a chemical strengthening step of bringing a glass substrate into contact with a heated chemical strengthening salt melted liquid and chemically strengthening a surface layer of the glass substrate at a desired temperature,
wherein the method further includes:
a treatment in which the glass substrate having undergone the chemical strengthening treatment is brought into contact with a first treatment liquid containing a melt of a first material having a solidification temperature below that of the chemical strengthening salt, and
a treatment in which the glass substrate having been brought into contact with the first treatment liquid is brought into contact with a second treatment liquid containing a melt of a second material having a solidification temperature below that of the first material.

[Structure 18]
The method for manufacturing a glass substrate for a magnetic disk having Structure 17,
wherein the temperature of the first treatment liquid is set to be above the solidification temperature of the chemical strengthening salt, and
the temperature of the second treatment liquid is set to be above the solidification temperature of the first material.

[Structure 19]
The method for manufacturing a glass substrate for a magnetic disk having any one of Structures 15 to 18,
wherein said treatment liquid is a molten nitrate.

[Structure 20]
The method for manufacturing a glass substrate for a magnetic disk having any one of Structures 15 to 19,
wherein the temperature of the glass substrate having been brought into contact with the treatment liquid is lowered stepwise and/or continuously.

[Structure 21]
A method for manufacturing a glass substrate for a magnetic disk, including a chemical strengthening step of bringing a glass substrate into contact with a heated chemical strengthening salt melted liquid and chemically strengthening a surface layer of the glass substrate at a desired temperature,
wherein a surface of the glass substrate having undergone the chemical strengthening treatment is coated with a melted liquid of a material which solidifies into a vitreous form.

[Structure 22]
A method for manufacturing a glass substrate for a magnetic disk, including a chemical strengthening step of bringing a glass substrate into contact with a heated chemical strengthening salt melted liquid and chemically strengthening a surface layer of the glass substrate at a desired temperature, and a cooling step of cooling the glass substrate having undergone the chemical strengthening treatment,
wherein the glass substrate coated with a melted liquid of a material which solidifies into a vitreous form is cooled to a predetermined temperature.

[Structure 23]
The method for manufacturing a glass substrate for a magnetic disk having Structure 21 or 22,
wherein the temperature of the glass substrate coated with the melted liquid of the material which solidifies into a vitreous form is lowered to a predetermined temperature while preventing deposition of a crystal on the surface of the glass substrate.

[Structure 24]

The method for manufacturing a glass substrate for a magnetic disk having any one of Structures 21 to 23, wherein the coating of the glass substrate with the melted liquid of the material which solidifies into a vitreous form is conducted at a temperature above the solidification temperature of the chemical strengthening salt.

[Structure 25]

A method for manufacturing a glass substrate for a magnetic disk, including a chemical strengthening step of bringing a glass substrate into contact with a heated chemical strengthening salt melted liquid and chemically strengthening a surface layer of the glass substrate at a desired temperature, and a cooling step of cooling the glass substrate having undergone the chemical strengthening treatment, wherein in the cooling step, the temperature of the glass substrate is lowered to a predetermined temperature while preventing solidification of the chemical strengthening salt in the chemical strengthening salt melted liquid adhered to the surface of the glass substrate.

[Structure 26]

A method for manufacturing a magnetic disk, wherein at least a magnetic layer is formed on a glass substrate for a magnetic disk which is manufactured by the method for manufacturing a glass substrate for a magnetic disk having any one of Structures 15 to 25.

In addition, the method for manufacturing a glass substrate for a magnetic disk according to the present invention, including the chemical strengthening step of bringing a glass substrate into contact with a heated chemical strengthening melted liquid, may further include a contact step in which the glass substrate having undergone the chemical strengthening treatment is brought into contact with a treatment liquid having a solidification temperature below that of the chemical strengthening melted liquid, whereby the chemical strengthening melted liquid adhered to the surface of the glass substrate having undergone the chemical strengthening treatment is diffused from the surface of the glass substrate without solidifying.

Besides, in the method for manufacturing a glass substrate for a magnetic disk according to the present invention, the treatment liquid used in the cooling step may be a liquid containing at least a part of the metal salts contained in the chemical strengthening salt, whereby the chemical strengthening salt melted liquid used in the chemical strengthening treatment and adhered to the surface of the glass substrate can be mixed, without separation (in liquid state), with the treatment liquid used in the cooling step. This ensures that the crystallization temperature of the chemical strengthening salt melted liquid adhered to the glass substrate surface can be lowered through freezing point depression. Therefore, crystallization of the strengthening salt melted liquid on the glass substrate surface in the cooling step can be prevented more assuredly.

In addition, the melted liquid used in the cooling step may contain at least a part of the metal salts contained in the chemical strengthening salt.

INDUSTRIAL APPLICABILITY

The present invention is applicable to a method for manufacturing a glass substrate for a magnetic disk which constitutes a magnetic disk for use in hard disk drives (HDD) and the like serving as magnetic disk apparatuses, and to a method for manufacturing a magnetic disk by use of the glass substrate for a magnetic disk.

The invention claimed is:

1. A method for manufacturing a glass substrate for a magnetic disk, comprising:

a chemical strengthening step of bringing a glass substrate into contact with a heated chemical strengthening salt melted liquid and chemically strengthening a surface layer of said glass substrate at a desired temperature, and a cooling step of cooling said glass substrate having undergone said chemical strengthening step, wherein in said cooling step, the temperature of said glass substrate is lowered to a room temperature, without crystallizing said chemical strengthening salt in said chemical strengthening salt melted liquid adhered to a surface of said glass substrate, wherein the glass substrate is an aluminosilicate glass substrate, wherein after said cooling step, a maximum value of waves in the surface of the glass substrate is kept to a maximum value of 5 nm or below when measuring waves having a frequency corresponding to a wavelength of 4 μm to 1 mm within a rectangle region having side lengths of 800 μm and 980 μm, wherein said cooling step comprises a first cooling treatment in which said glass substrate is brought into contact with a first treatment liquid, and a second cooling treatment or second and latter cooling treatments in which said glass substrate is brought into contact (sequentially) with at least one treatment liquid including a second treatment liquid or of second and latter treatment liquids after said first cooling treatment;

wherein said first treatment liquid used in said first cooling treatment is regulated to a temperature which is below a temperature of said chemical strengthening salt melted liquid in said chemical strengthening step and which is above a solidification temperature of said chemical strengthening salt; and wherein said second or latter treatment liquid used in said second or latter cooling treatment is regulated to a temperature which is below a temperature of the precedent-stage treatment liquid used in the cooling treatment carried out precedent to the cooling treatment in consideration.

2. The method for manufacturing a glass substrate for a magnetic disk as set forth in claim 1, wherein said cooling step includes a cooling treatment in which said glass substrate is brought into contact with a treatment liquid containing a melt of a material having a solidification temperature below a temperature of said chemical strengthening salt, and a temperature of said treatment liquid is regulated to be below the temperature of the chemical strengthening salt melted liquid in said chemical strengthening step.

3. The method for manufacturing a glass substrate for a magnetic disk as set forth in claim 1, wherein the aluminosilicate glass substrate contains lithium.

4. The method for manufacturing a glass substrate for a magnetic disk as set forth in claim 1, wherein the chemical strengthening salt melted liquid is obtained by melting a chemical strengthening salt prepared by mixing a plurality of nitrates.

5. The method for manufacturing a glass substrate for a magnetic disk as set forth in claim 1, further comprising:

a polishing step of polishing the surface of said glass substrate.

6. The method for manufacturing a glass substrate for a magnetic disk as set forth in claim 1, wherein in said cooling step, the temperature of said glass substrate is lowered to the room temperature so as to prevent volume variation and heat of solidification of the chemical strengthening salt.

7. A method for manufacturing a glass substrate for a magnetic disk, comprising:
a chemical strengthening step of bringing a glass substrate into contact with a heated chemical strengthening salt melted liquid and chemically strengthening a surface layer of said glass substrate at a desired temperature, and
a cooling step of cooling said glass substrate having undergone said chemical strengthening step,
wherein in said cooling step, a cooling treatment is carried out in which said glass substrate is brought into contact with a treatment liquid containing a melt of a material having a solidification temperature below a temperature of said chemical strengthening salt before crystallization of the chemical strengthening salt melted liquid remaining on said glass substrate begins,
a temperature of said treatment liquid is regulated to be below the temperature of the chemical strengthening salt melted liquid in said chemical strengthening step, and
the chemical strengthening salt melted liquid remaining on said glass substrate is diffused into the treatment liquid without crystallizing the chemical strengthening salt,
wherein the glass substrate is an aluminosilicate glass substrate,
wherein after said cooling step, a maximum value of waves in the surface of the glass substrate is kept to a maximum value of 5 nm or below when measuring waves having a frequency corresponding to a wavelength of 4 μm to 1 mm within a rectangle region having side lengths of 800 μm and 980 μm,
wherein in said cooling step, the glass substrate is cooled to a room temperature while suppressing occurrence of the waves,
wherein the chemical strengthening salt melted liquid is obtained by melting a chemical strengthening salt prepared by mixing a plurality of nitrates,
wherein said cooling treatment comprises a first cooling treatment in which said glass substrate is brought into contact with a first treatment liquid, and a second cooling treatment or second and latter cooling treatments in which said glass substrate is brought into contact (sequentially) with at least one treatment liquid including a second treatment liquid or of second and latter treatment liquids after said first cooling treatment;
wherein said first treatment liquid used in said first cooling treatment is regulated to a temperature which is below the temperature of said chemical strengthening salt melted liquid in said chemical strengthening step and which is above the solidification temperature of said chemical strengthening salt; and
wherein said second or latter treatment liquid used in said second or latter cooling treatment is regulated to a temperature which is below the temperature of the precedent-stage treatment liquid used in the cooling treatment carried out precedent to the cooling treatment in consideration.

8. The method for manufacturing a glass substrate for a magnetic disk as set forth in claim 7,
wherein said treatment liquid is a melted liquid containing a nitrate as a main material.

9. The method for manufacturing a glass substrate for a magnetic disk as set forth in claim 8,
wherein said treatment liquid contains a plurality of nitrates selected from among alkali metal nitrates and alkaline earth metal nitrates in a predetermined ratio, whereby said treatment liquid is regulated to have a desired solidification temperature.

10. The method for manufacturing a glass substrate for a magnetic disk as set forth in claim 7,
wherein the temperature of said glass substrate having undergone said chemical strengthening step is lowered stepwise.

11. A method for manufacturing a magnetic disk,
wherein at least a magnetic layer is formed on a glass substrate for a magnetic disk which is manufactured by the method for manufacturing a glass substrate for a magnetic disk as set forth in claim 7.

12. The method for manufacturing a glass substrate for a magnetic disk as set forth in claim 7,
wherein the aluminosilicate glass substrate contains lithium.

13. The method for manufacturing a glass substrate for a magnetic disk as set forth in claim 7, further comprising:
a polishing step of polishing the surface of said glass substrate.

14. The method for manufacturing a glass substrate for a magnetic disk as set forth in claim 7,
the chemical strengthening salt melted liquid remaining on said glass substrate is diffused into the treatment liquid so as to prevent volume variation and heat of solidification of the chemical strengthening salt.

15. A method for manufacturing a glass substrate for a magnetic disk, comprising:
a chemical strengthening step of bringing a glass substrate into contact with a heated chemical strengthening salt melted liquid and chemically strengthening a surface layer of said glass substrate at a desired temperature, and
a cooling step of cooling said glass substrate having undergone said chemical strengthening step,
wherein in said cooling step, a surface of said glass substrate is coated with a melted liquid containing a melt of a material capable of being solidified into a vitreous form and different from the chemical strengthening salt melted liquid before the temperature of said glass substrate is lowered and crystallization of the chemical strengthening salt melted liquid begins but incapable of being crystallized after the temperature of said glass substrate is lowered, and
wherein the glass substrate is an aluminosilicate glass substrate,
wherein after said cooling step, a maximum value of waves in the surface of the glass substrate is kept to a maximum value of 5 nm or below when measuring waves having a frequency corresponding to a wavelength of 4 μm to 1 mm within a rectangle region having side lengths of 800 μm and 980 μm,
wherein the melted liquid contains a plurality of nitrates that have a composition so as to prevent the nitrates from being crystallized in the cooling step,
wherein said cooling step comprises a first cooling treatment in which said glass substrate is brought into contact with a first treatment liquid, and a second cooling treatment or second and latter cooling treatments in which said glass substrate is brought into contact (sequentially) with at least one treatment liquid including a second treatment liquid or of second and latter treatment liquids after said first cooling treatment,
wherein said first treatment liquid used in said first cooling treatment is regulated to a temperature which is below a temperature of said chemical strengthening salt melted liquid in said chemical strengthening step and which is above a solidification temperature of said chemical strengthening salt, and wherein said second or latter treatment liquid used in said second or latter cooling treatment is regulated to a temperature which is below a temperature of the precedent-stage treatment liquid used in the cooling treatment carried out precedent to the cooling treatment in consideration.

16. The method for manufacturing a glass substrate for a magnetic disk as set forth in claim 15, wherein in said cooling step, the temperature of said glass substrate is lowered to a predetermined temperature while preventing crystallization of said chemical strengthening salt on the surface of said glass substrate, by replacing the chemical strengthening salt melted liquid on the surface of the glass substrate by the melted liquid.

17. The method for manufacturing a glass substrate for a magnetic disk as set forth in claim 15, wherein the temperature of said melted liquid with which the surface of said glass substrate is coated in said cooling step is regulated to be above the solidification temperature of said chemical strengthening salt.

18. The method for manufacturing a glass substrate for a magnetic disk as set forth in claim 15, wherein said plurality of nitrates are selected from among alkali metal nitrates and alkaline earth metal nitrate in a predetermined ratio.

19. The method for manufacturing a glass substrate for a magnetic disk as set forth in claim 15, wherein the aluminosilicate glass substrate contains lithium.

20. The method for manufacturing a glass substrate for a magnetic disk as set forth in claim 15, wherein the chemical strengthening salt melted liquid is obtained by melting a chemical strengthening salt prepared by mixing a plurality of nitrates.

21. The method for manufacturing a glass substrate for a magnetic disk as set forth in claim 15, further comprising:

a polishing step of polishing the surface of said glass substrate.

22. The method for manufacturing a glass substrate for a magnetic disk as set forth in claim 15, wherein in the cooling step, the surface of the glass substrate is coated by immersing the glass substrate in the melted liquid that is regulated to a temperature of 240 to 330° C. in a range from several minutes to several tens of minutes, in a condition where crystallization of a chemical strengthening salt remaining on the surface of the glass substrate does not begin.

23. A method for manufacturing a glass substrate for a magnetic disk, comprising:

a chemical strengthening step of bringing a glass substrate into contact with a heated chemical strengthening salt melted liquid and chemically strengthening a surface layer of said glass substrate at a desired temperature, and a cooling step of cooling said glass substrate having undergone said chemical strengthening step, wherein in said cooling step, a cooling treatment is carried out in which said glass substrate is brought into contact with a treatment liquid containing a melt of a material having a solidification temperature below a temperature of said chemical strengthening salt before crystallization of the chemical strengthening salt melted liquid remaining on said glass substrate begins, a temperature of said treatment liquid is regulated to be below the temperature of the chemical strengthening salt melted liquid in said chemical strengthening step, and the chemical strengthening salt melted liquid remaining on said glass substrate is diffused into the treatment liquid without solidifying, and wherein the glass substrate is an aluminosilicate glass substrate, and wherein said cooling treatment comprises a first cooling treatment in which said glass substrate is brought into contact with a first treatment liquid, and a second cooling treatment or second and latter cooling treatments in which said glass substrate is brought into contact (sequentially) with at least one treatment liquid including a second treatment liquid or of second and latter treatment liquids after said first cooling treatment;

said first treatment liquid used in said first cooling treatment is regulated to a temperature which is below the temperature of said chemical strengthening salt melted liquid in said chemical strengthening step and which is above the solidification temperature of said chemical strengthening salt; and said second or latter treatment liquid used in said second or latter cooling treatment is regulated to a temperature which is below the temperature of the precedent-stage treatment liquid used in the cooling treatment carried out precedent to the cooling treatment in consideration and which is above the solidification temperature of said precedent-stage treatment liquid.

\* \* \* \* \*